United States Patent [19]

Wilson

[11] Patent Number: 5,788,181
[45] Date of Patent: Aug. 4, 1998

[54] THERMOSTATIC METAL ACTUATOR FOR NOZZLE ACTUATION

[75] Inventor: John C. Wilson, Mesa, Ariz.

[73] Assignee: McDonnell Douglas Helicopter Co., Mesa, Ariz.

[21] Appl. No.: 543,361

[22] Filed: Oct. 16, 1995

[51] Int. Cl.$^6$ ................................................. B64C 27/18
[52] U.S. Cl. ...................... 244/7 A; 244/52; 244/23 D; 239/265.43; 239/602; 239/75; 416/20 A
[58] Field of Search ........................ 246/7 R, 7 A, 246/17.11, 207, 6, 53 R, 52, 23 D, 12.4; 251/11, 212; 137/79; 239/265.37, 265.39, 265.43, 602, 75; 416/20 R, 21, 22, 20 A

[56] References Cited

U.S. PATENT DOCUMENTS

| | | |
|---|---|---|
| 2,544,497 | 3/1951 | Herrick ........................ 244/7 A |
| 2,667,226 | 1/1954 | Doblhoff ........................ 416/20 |
| 3,143,293 | 8/1964 | Purse ........................ 239/75 |
| 3,159,360 | 12/1964 | Ryan et al. ........................ 244/7 A |
| 3,207,457 | 9/1965 | Kisovec ........................ 244/7 A |
| 3,464,650 | 9/1969 | Girard ........................ 244/207 |
| 3,592,412 | 7/1971 | Glatfelter . |
| 3,730,436 | 5/1973 | Madden et al. . |
| 3,792,827 | 2/1974 | Girard . |
| 3,797,783 | 3/1974 | Kisovec . |
| 3,865,208 | 2/1975 | Nagler ........................ 416/22 |
| 3,892,358 | 7/1975 | Gisslen . |
| 3,976,244 | 8/1976 | Logsdon ........................ 251/11 |
| 4,128,208 | 12/1978 | Ryan et al. . |
| 4,603,568 | 8/1986 | Siemers et al. . |
| 4,813,608 | 3/1989 | Holowach et al. . |
| 4,817,912 | 4/1989 | McCabe . |
| 5,104,311 | 4/1992 | Maughan et al. ........................ 239/75 |
| 5,454,530 | 10/1995 | Rutherford et al. ........................ 244/7 A |
| 5,529,458 | 6/1996 | Humpherson ........................ 244/75 R |
| 5,533,929 | 7/1996 | Attridge ........................ 137/79 |

*Primary Examiner*—Galen L. Barefoot
*Attorney, Agent, or Firm*—Donald E. Stout; Kenton R. Mullins

[57] ABSTRACT

A nozzle for use on opposing ends of the rotor of a jet powered tri-mode aircraft is disclosed. The nozzle includes two thermally-controlled doors, which are moveable between an open configuration where hot jet engine exhaust is vented therethrough to propel the rotor in a helicopter mode, and a second closed configuration where the two doors are tightly sealed to provide a stable aerodynamic surface for the rotor when the jet powered tri-mode aircraft is operating in an airplane mode. The two doors are thermally-activated by an internal surrounding temperature, such that they remain open by the hot jet engine exhaust passing thereby in the helicopter mode, and remain shut by resulting cooler air when the hot jet engine exhaust is not routed by the two nozzle doors.

19 Claims, 3 Drawing Sheets

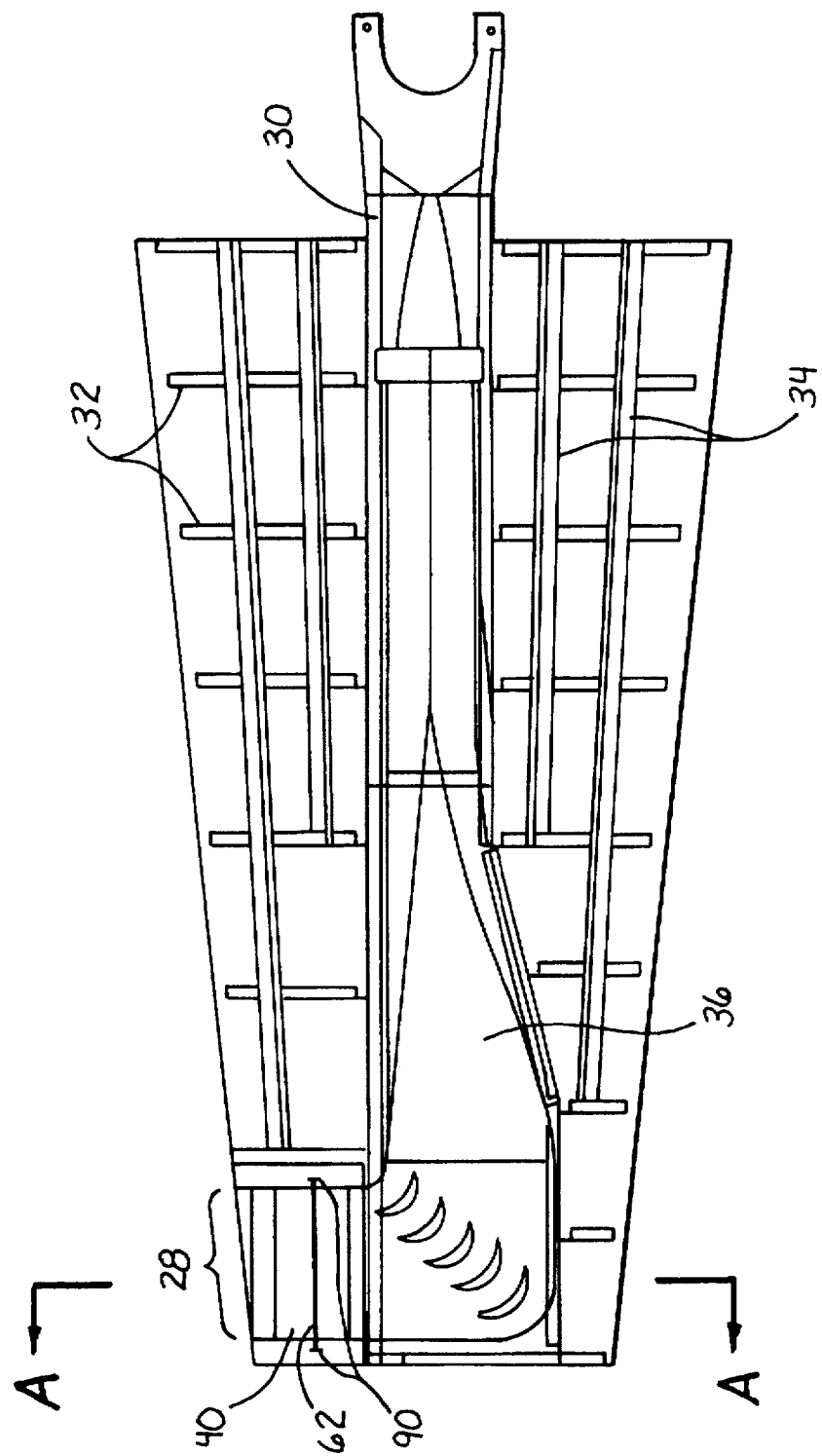

THERMOSTATIC METAL ACTUATOR FOR NOZZLE ACTUATION

The U.S. Government has a paid-up license in this invention and the right in limited circumstances to require the patent owner to license others on reasonable terms as provided for by the terms of MSV Contract No. N62269-85-C-0702 awarded by the U.S. Department of Defense (Navy).

FIELD OF THE INVENTION

The present invention relates generally to jet powered tri-mode aircraft operable in both helicopter and airplane modes and, more particularly, to a thermally-activated nozzle system on a wing of the jet powered tri-mode aircraft.

BACKGROUND OF THE INVENTION

A bimetallic actuator may be formed of a first sheet of metal having a first coefficient of expansion and a second sheet of metal having a second coefficient of expansion. Since the first and second sheets of metal have different coefficients of expansion, the bimetallic actuator is responsive to temperature. For example, both metal sheets of the bimetallic actuator may be relatively flat at a cool temperature, but the metal sheet having the higher coefficient of expansion may cause the bimetallic actuator to bend at higher temperatures.

Bimetallic actuators have been used for a variety of purposes. U.S. Pat. No. 4,817,912 to McCabe discloses a bimetal operator for an air-controlled damper. The bimetal operator of this patent pertains to the actuation of dampers for fire and smoke air-flow control systems. The bimetallic operator is used in combination with an overcenter link and biasing spring. An electrical resistance heating pad is also incorporated for remote operation.

U.S. Pat. No. 4,813,608 to Holowach et al. discloses a bimetallic actuator used as an elastic leaf seal for jet engine exhaust nozzles. U.S. Pat. No. 4,603,568 to Siemers et al. discloses a method of fabricating bimetallic actuators for use on exhaust nozzle flaps and seals. None of these references disclose a combination of bimetallic actuators for use on the main rotor of a jet powered tri-mode aircraft for selectively applying power therethrough to power the main rotor in a helicopter mode, and remaining shut to produce an aerodynamic foil in an airplane mode when the main rotor is fixed in a direction transverse to flight.

The present invention, together with additional features and advantages thereof, may best be understood by reference to the following description taken in connection with the accompanying illustrative drawings.

BRIEF DESCRIPTION OF THE DRAWINGS

FIG. 2 is a top cross-sectional view of a portion of the main rotor f the jet powered tri-mode aircraft of the presently preferred embodiment;

DETAILED DESCRIPTION OF THE PREFERRED EMBODIMENTS

Figure 1A:
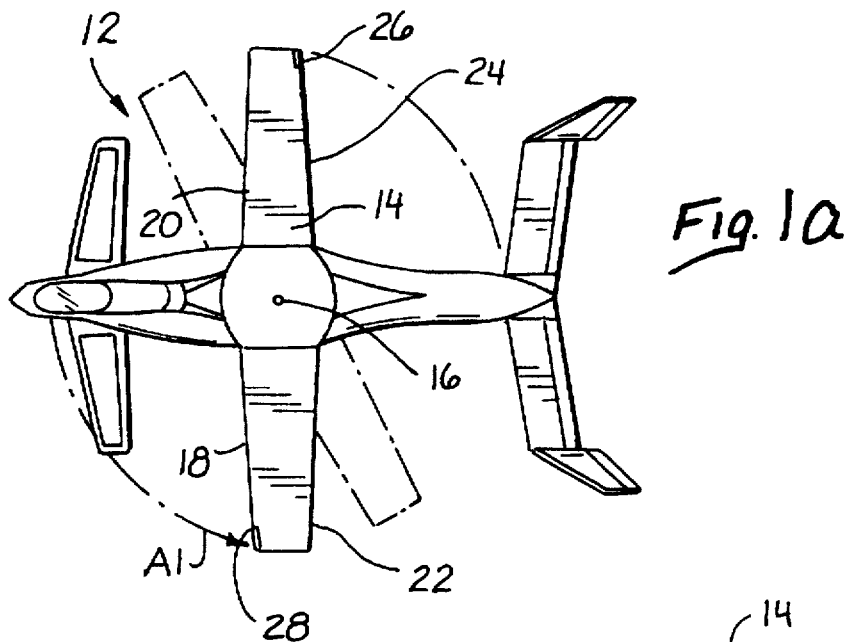
FIG. 1a is a top planar of view of the jet powered tri-mode aircraft according to the presently preferred embodiment.

Turning to FIG. 1, the jet powered tri-mode aircraft 12 of the presently preferred embodiment is depicted with solid lines in the airplane mode. The main rotor 14 of the jet powered tri-mode aircraft 12 remains fixed at high travelling velocities to enable the jet powered tri-mode aircraft 12 to function as an airplane. At low travelling velocities, the main rotor 14 rotates in a direction shown by arrow A1. A ghost image of the main rotor 14 is shown in dotted lines to illustrate rotation of the main rotor 14 about axis 16. The main rotor 14 of the jet powered tri-mode aircraft 12 thus rotates to provide for vertical takeoffs and landings, for example.

The jet powered tri-mode aircraft 12 is powered by a jet engine in both the helicopter mode and the airplane mode. In the helicopter mode, hot engine exhaust gases from the jet engine (not shown) are ducted up through the main rotor 14 and out of the first thermally-controlled nozzle 28 and the second thermally-controlled nozzle 26. The hot engine exhaust venting through the first and second thermally-controlled nozzles 26, 28 spins the main rotor 14 about the axis 16 in a manner similar to a garden sprinkler. Further details of the general structure shown in FIG. 1 are disclosed in applicant's copending application Ser. No. 08/068,907 filed on May 28, 1993 and titled "Canard Rotor/Wing", now U.S. Pat. No. 5,454,530.

In the airplane mode, a left first edge 18 of the main rotor 14 leads a left rear edge 22, and a right first edge 20 of the main rotor 14 leads a right rear edge 24. The first thermally-controlled nozzle 28 and the second thermally-controlled nozzle 26 remain closed in the airplane mode.

While the first thermally-controlled nozzle 28 trails the left rear edge 22 and expels hot jet engine exhaust in the helicopter mode, this same nozzle 28 leads the left rear edge 22 and is closed in the airplane mode.

Figure 1B:
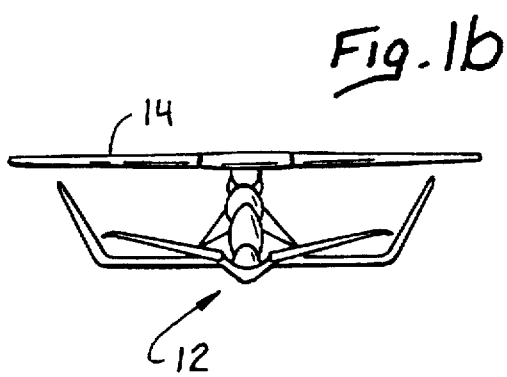
FIG. 1b is a front side view of the jet powered tri-mode aircraft according to the presently preferred embodiment.
Figure 1C:
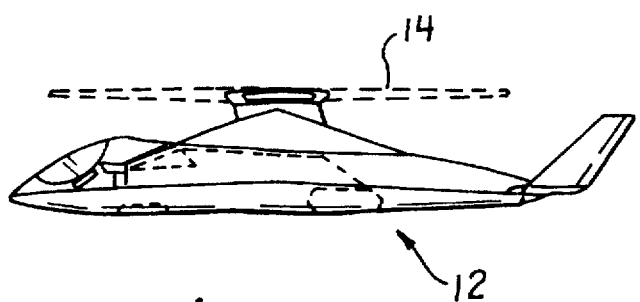
FIG. 1c is a side view of the jet powered tri-mode aircraft according to the presently preferred embodiment.

In the airplane mode, the first and second thermally-controlled nozzles 28, 26 must remain tightly closed and rigid to provide a stable aerodynamic foil for the jet powered tri-mode aircraft 12 travelling at high velocities. FIGS. 1b and 1c show front and side views of the jet powered tri-mode aircraft 12, respectively.

Figure 1D:
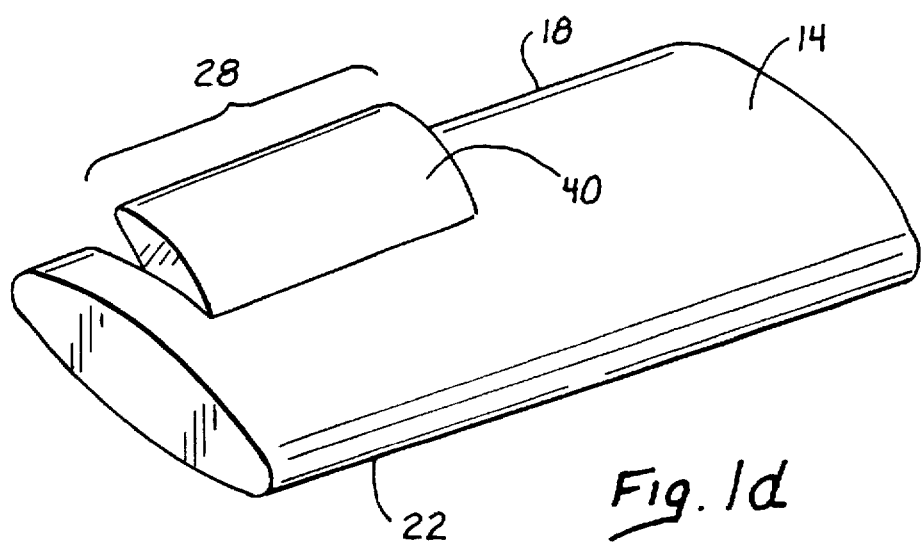
FIG. 1d a perspective view of a portion of the main rotor of the jet powered tri-mode aircraft of the presently preferred embodiment.

FIG. 1d shows a perspective view of the left first edge 18 and the left rear edge 22 of the jet powered tri-mode aircraft 12. An upper nozzle door 40 of the first thermally-controlled nozzle 28 is shown open, to thereby allow hot jet exhaust to vent therethrough and power the main rotor 14. The upper nozzle door 40 of the first thermally-controlled nozzle 28 would be closed and would conform to the surface of the main rotor 14 in the airplane mode.

A top cross-sectional view of the left side of the main rotor 14 is shown in FIG. 2. The left side of the main rotor 14 comprises an upper spar 30 and a lower spar (not shown) located beneath the upper spar 30. Ribs 32 and stringers 34 provide support to the main rotor 14, and a duct 36 vents hot jet engine exhaust through the main rotor 14 and out of the first thermally-controlled nozzle 28. The upper nozzle door 40 pivots about the outer cylindrical end 62 when the upper nozzle door 40 opens and closes (see FIG. 3). The pin accommodating means 90 holds the outer cylindrical end 62 in place. In the presently preferred embodiment, the outer cylindrical end 62 is approximately 11 inches long, with approximately 1 inch of each end of the outer cylindrical end 62 fitting into the pin accommodating means 90. The diameter of the outer cylindrical end 62 is preferably about one quarter inch. The width of the first thermally-controlled nozzle 28 is preferably approximately 10 inches long.

Figure 3:
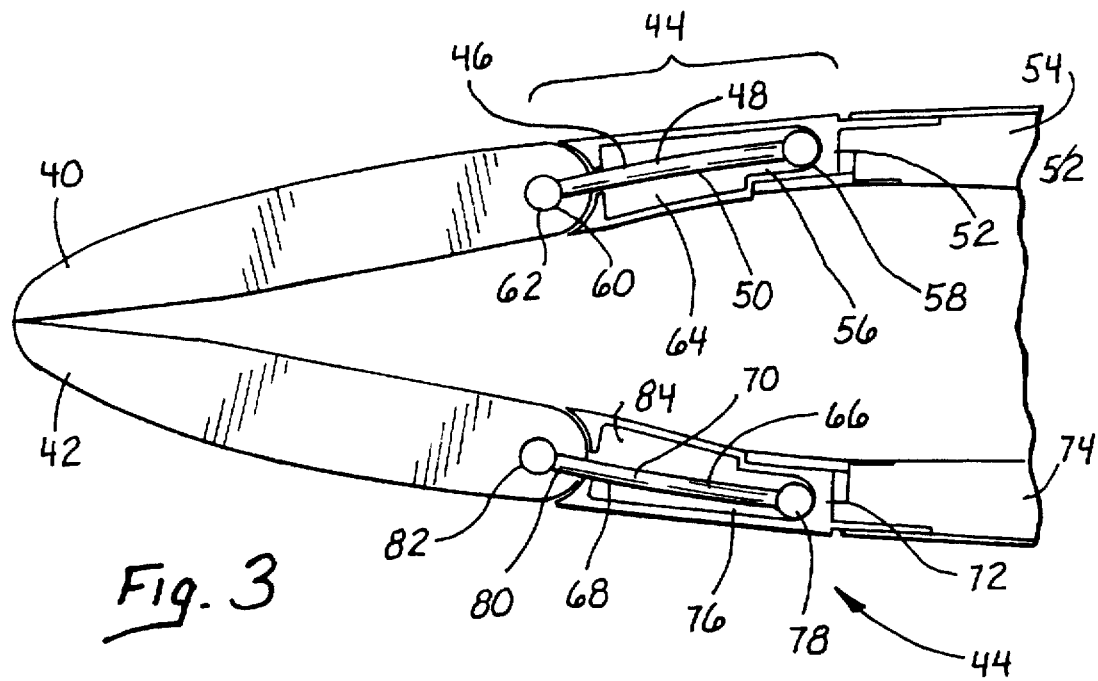
FIG. 3 is a side cross-sectional view of a portion of a rotor, and illustrates a thermally-controlled nozzle of the presently preferred embodiment in the closed position.

A side cross-sectional view of the left end of the main rotor 14, taken along line A—A of FIG. 2, is shown in FIG. 3. The first thermally-controlled nozzle 28 comprises the upper nozzle door 40, a lower nozzle door 42, and a thermally-activated nozzle controlling means 44. The thermally-activated nozzle controlling means 44 preferably comprises an upper bimetal spring 46 and a lower bimetal spring 66.

An upper layer of the upper bimetal spring 46 comprises a first metal 48 having a first coefficient of expansion and a second metal 50 having a second coefficient of expansion. The coefficient of expansion of the second metal 50 is greater than the coefficient of expansion of the first metal 48, to thus allow the second metal 50 to expand when heated by the hot jet engine exhaust to thereby open the upper nozzle door 40. The upper bimetal spring 46 comprises an outer cylindrical end 62, which fits into a slot 60 of the upper nozzle door 40, and further comprises an inner cylindrical end 58, which fits into a slot 56 in the upper cavity member 52. In addition to accommodating the inner cylindrical end 58, the upper cavity member 52 provides a cavity 64 in which the upper bimetal spring 46 senses temperature and bends.

The lower bimetal spring 66 similarly comprises a lower layer comprising a third metal 68 having a third coefficient of expansion, and an upper layer comprising a fourth metal 70 having a fourth coefficient of expansion. The coefficient of expansion of the fourth metal 70 is larger than the coefficient of expansion of the third metal 68, so that when the temperature of the cavity 64 reaches a predetermined value, the fourth metal 70 expands to bend the lower bimetal spring 66 and open the lower nozzle door 42.

Just as the upper nozzle door 40 pivots about the outer cylindrical end 62, which is embedded in the pin accommodating means 90 (FIG. 2), the lower nozzle door 42 pivots about the outer cylindrical end 82, which fits into the slot 80 of the lower nozzle door 42. A lower cavity member 72 provides a slot 76 to accommodate the inner cylindrical end 78 of the lower bimetal spring 66, and further provides the cavity 84, which provides temperature changes to the lower bimetal spring 66 and further provides room for the lower bimetal spring 66 to bend.

The outer cylindrical end 62 of the upper bimetal spring 46 is thus secured to the pin accommodating means 90 (FIG. 2), and the inner cylindrical end 58 of the upper bimetal spring 46 is secured in the slot 56 of the upper cavity member 52. The upper cavity member 52 is secured to an upper surface 54 of the main rotor. Similarly, the lower cavity member 72 is secured to a lower surface 74 of the main rotor 14.

Figure 4:
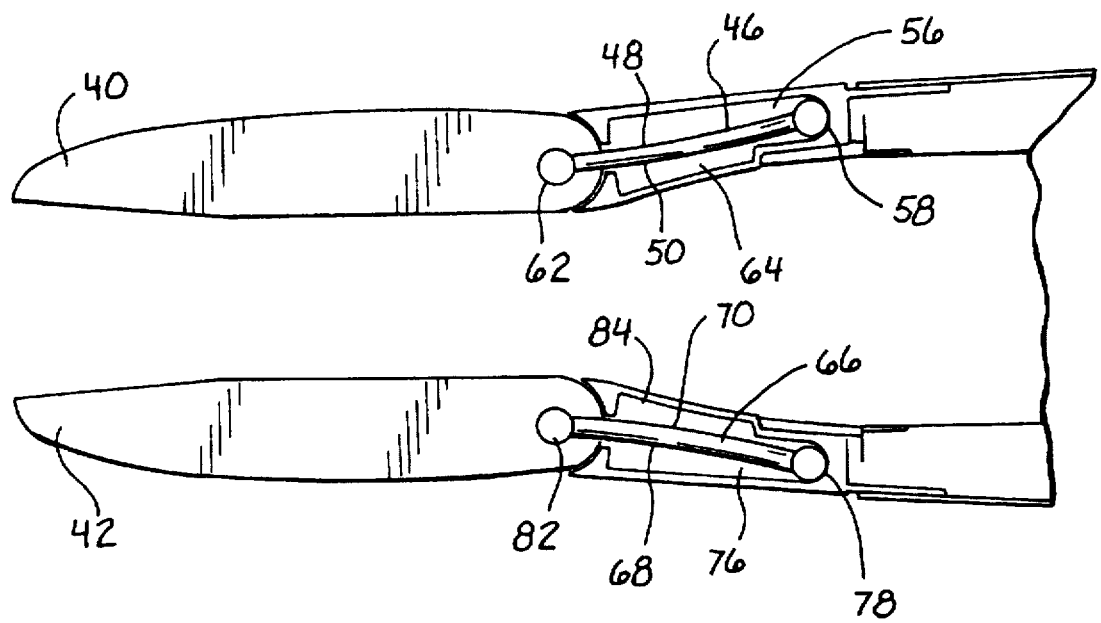
FIG. 4 illustrates the thermally-controlled nozzle of FIG. 3 in the open position.

FIG. 3 thus shows the first thermally-controlled nozzle 28 in the closed position, which corresponds to the airplane mode. FIG. 4 shows the first thermally-controlled nozzle 28 in the open position, which corresponds to the helicopter mode. In the airplane mode (FIG. 3) the area between the upper nozzle door 40 and the lower nozzle door 42 has a temperature which is approximately the same as the temperature on the outer surfaces of the upper nozzle door 40 and the lower nozzle door 42. In the helicopter mode, the temperature on the outer surfaces of the upper nozzle door 40 and the lower nozzle door 42 may still be relatively cool, but the temperature between these two nozzle doors 40, 42 is approximately 1250 degrees fahrenheit, which is the temperature of the hot jet engine exhaust in the presently preferred embodiment.

Energy from this high temperature transfers into the upper cavity 64 and the lower cavity 84 to thereby heat the upper bimetal spring 46 and the lower bimetal spring 66, respectively. This high temperature of the cavity 64 causes the second metal 50 to expand more than the first metal 48, to thus bend the upper bimetal spring 46 and open the upper nozzle door 40. Similarly, a high temperature in the cavity 84 heats the lower bimetal spring 66, causing the fourth metal 70 to expand more than the third metal 68. The greater relative expansion of the fourth metal 70 bends the lower bimetal spring 66 and causes the lower nozzle door 42 to open. With each bend of the upper bimetal spring 46 and the lower bimetal spring 66, the inner cylindrical ends 58, 78 rotate within their respective slots 56, 76.

When the jet powered tri-mode aircraft 12 reaches a sufficiently high travelling velocity, the main rotor 14 slows and then stops for transition to the airplane mode. As the main rotor 14 slows, and eventually stops, the flow of hot jet engine exhaust through the main rotor 14 is increasingly restricted. Finally, no hot jet engine exhaust is routed through the main rotor 14 and the main rotor 14 is locked in an orientation transverse to the direction of flight. When hot jet engine exhaust is no longer routed through duct 36, for example, (FIG. 2), the temperatures within upper cavity 64 and the lower cavity 84 decrease, eventually reaching a temperature, which is close to or the same as the temperature on the outer surfaces of the upper and lower nozzles 40, 42. At this point, the upper and lower bimetal springs 46, 66 are configured to firmly hold the upper and lower nozzle doors 40, 42 in a closed configuration.

Thus, the deflection of each of the bimetal springs 46, 66 is directly proportional to their changes in temperature. The deflection of these two bimetal springs 46, 66 is further directly proportional to the coefficients of expansion of the two metals used for each of the springs.

In the presently preferred embodiment, the first metal 48 and the third metal 68 are the same, and the second metal 50 and the fourth metal 70 are the same. The two outer cylindrical ends 62, 82 and the two inner cylindrical ends 58, 78 preferably all comprise the same metal as the first metal 48 and the third metal 68. The deflection of the two bimetal springs 46, 66 is inversely proportional to the thickness of the combined layers of metal, and the amount of deflection (change in curvature) is also affected by the ratio of the two metals'elastic moduli and thicknesses. Using these characteristics, thermally-activated nozzle controlling means may be designed to operate in a variety of different ways, according to preference. In the presently preferred embodiment, each of the two bimetallic springs 46, 66 is approximately 10 inches long, 2 inches wide, and 0.060 inches thick.

Each of the two bimetal springs 46, 66 may be configured to open and close at certain times, temperatures, or rates by controlling the quantity and rate of heat transferred into each of the upper and lower cavities 64, 84. For example, air within the two cavities 64, 84 may be evacuated. Alternatively, vent holes may be placed on upper surfaces of the upper cavity member 52 and on lower surfaces of the lower cavity member 72 to connect the respective cavities 64, 84 to temperatures on the outside of the main rotor 14.

These vent holes would keep the temperatures within the cavities 64, 84 lower, and would further enable the upper and lower nozzle doors 40, 42 to shut very quickly when hot jet engine exhaust is attenuated or no longer routed through the main rotor 14.

Alternatively, vent holes may be placed on the lower surface of the upper cavity member 52 and on the upper surface of the lower cavity member 72, to thereby keep the temperatures within the cavities 64, 84 higher. This configuration would carry its own distinct characteristics such as, for example, the upper and lower nozzle doors 40, 42 remaining open longer after the flow of hot jet engine exhaust is restricted from the main rotor 14.

Since the upper and lower bimetal springs 46, 66 react to the temperatures of the cavities 64, 84, a means of evacuating the initial cool pocket of air from between the upper nozzle door 40 and the lower nozzle door 42 must be present. In the presently preferred embodiment, the stiffness of the upper and lower bimetal springs 46, 66 is set to hold the upper and lower nozzle doors 40, 42 firmly shut until a pressure within these doors reaches approximately 30 psig. This pressure would be created by hot jet exhaust from the jet engine. The hot jet exhaust would be directed up into the main rotor 14, but would not be able to flow through the first and second thermally-controlled nozzles 28, 26 until these nozzles 28, 26 are opened.

The presently preferred embodiment allows the upper and lower bimetal springs 46, 48 to give slightly under a pressure of approximately 30 psig (created by the hot jet engine exhaust) to thereby slightly open the upper and lower nozzle doors 40, 42. Once open, the stiffness of the upper and lower bimetal springs 46, 66 is preferably designed to minimize nozzle door deflections resulting from inertial and airloads. As presently embodied, a stiffness of the upper and lower bimetal springs 46, 66, at any temperature below 250 degrees fahrenheit, holds the upper and lower nozzle doors 40, 42 completely shut. These two nozzle doors 40, 42 may thus withstand opening pressures of up to 5 psi to thereby allow the second thermally-controlled nozzle 26, to withstand forces as it trails the right first edge 20, and to further allow the first thermally-controlled nozzle 28 to remain shut and withstand air forces as it leads the left rear edge 22 in the airplane mode.

Similarly, in the helicopter mode, when the hot jet engine exhaust of about 1250 degrees fahrenheit is venting through the upper and lower nozzle doors 40, 42, these doors must remain rigid and withstand forces of approximately plus or minus 5 psi, which are exerted on the upper and lower nozzle doors 40, 42 from external forces such as air pressure differentials. The minimal deflection allowed when the upper and lower nozzle doors 40, 42 are open is preferably between one and two degrees.

Although an exemplary embodiment of the invention has been shown and described, many other changes, modifications and substitutions, in addition to those set forth in the above paragraph, may be made by one having ordinary skill in the art without necessarily departing from the spirit and scope of this invention.

I claim:

1. A jet powered tri-mode aircraft operating in a helicopter mode at low traveling velocities and operating in an airplane mode at high traveling velocities, the jet powered tri-mode aircraft comprising:

a main rotor rotating about an axis in the helicopter mode and fixed in a direction transverse to a direction of flight in the airplane mode;

two thermally-controlled nozzles located at opposing ends of the main rotor, each nozzle operating in an open position to expel jet exhaust and rotate the main rotor in the helicopter mode, and operating in a closed position to provide an airfoil in the airplane mode;

a thermally-activated nozzle controlling means for automatically opening the two thermally-controlled nozzles when the jet exhaust passing by an area near the thermally-activated nozzle controlling means raises a temperature of the thermally-activated nozzle controlling means to a predetermined temperature, and for automatically closing the two thermally-controlled nozzles when the temperature of the area falls below the predetermined temperature as a result of the jet exhaust no longer passing by the area.

2. The jet powered tri-mode aircraft according to claim 1, wherein the main rotor comprises a first edge and a second edge, the first edge leading the second edge when the jet powered tri-mode aircraft is operating in the airplane mode.

3. The jet powered tri-mode aircraft according to claim 2, wherein the first edge comprises:

a left first edge, defined as a portion to a left of the axis when the jet powered tri-mode aircraft is operating in the airplane mode; and a right first edge, defined as a portion to a right of the axis when the jet powered tri-mode aircraft is operating in the airplane mode.

4. jet powered tri-mode aircraft according to claim 3, wherein the second edge comprises:

left second edge, defined as a portion to a left of the axis, the left second edge trailing the left first edge when the jet powered tri-mode aircraft is operating in the airplane mode; and a right second edge, defined as a portion to a right of the axis, the right second edge trailing the right first edge when the jet powered tri-mode aircraft is operating in the airplane mode.

5. The jet powered tri-mode aircraft according to claim 4, wherein a first thermally-controlled nozzle of the two thermally-controlled nozzles is located on the left first edge of the rotor and a second thermally-controlled nozzle of the two thermally-controlled nozzles is located on the right second edge of the rotor.

6. The jet powered tri-mode aircraft according to claim 5, wherein the first thermally-controlled nozzle, located on the left first edge, leads the left second edge when the jet powered tri-mode aircraft is operating in the airplane mode, and wherein the second thermally-controlled nozzle, located on the right second edge, trails the right first edge when the jet powered tri-mode aircraft is operating in the helicopter mode, the first thermally-controlled nozzle thus leading, being closed, and operating as an aerodynamic wing surface when the jet powered tri-mode aircraft is operating in the airplane mode, and trailing, being open, and expelling exhaust when the jet powered tri-mode aircraft is operating in the helicopter mode.

7. A thermally-controlled nozzle for use on a jet powered tri-mode aircraft, the jet powered tri-mode aircraft driving a rotor with jet exhaust to rotate a rotor in a helicopter mode, and fixing the rotor in an airplane mode, the thermally-controlled nozzle comprising:

an upper bimetal spring having an inner end and an outer end, an upper layer of the upper bimetal spring comprising a first metal with a first coefficient of expansion, and a lower layer of the upper bimetal spring comprising a second metal with a second coefficient of expansion, the second coefficient of expansion being greater than the first coefficient of expansion;

an upper nozzle door having a slot for accommodating the outer end of the upper bimetal spring;

an upper cavity member connected to an upper surface of the rotor, the upper cavity member having a slot for accommodating the inner end of the upper bimetal spring; and a lower bimetal spring having an inner end and an outer end, a lower layer of the lower bimetal spring comprising a third metal with a third coefficient of expansion, and an upper layer of the lower bimetal spring comprising a fourth metal with a fourth coefficient of expansion, the fourth coefficient of expansion being greater than the third coefficient of expansion;

a lower nozzle door having a slot for accommodating the outer end of the lower bimetal spring; and a lower cavity member connected to a lower surface of the rotor, the lower cavity member having a slot for accommodating the inner end of the lower bimetal spring.

8. The thermally-controlled nozzle for use on a jet powered tri-mode aircraft according to claim 7, wherein jet exhaust is routed through the thermally-controlled nozzle to drive the rotor in the helicopter mode, the jet exhaust heating and expanding the second and fourth metals to thereby open the upper and lower nozzle doors for the expelling of the jet exhaust therethrough.

9. The thermally-controlled nozzle for use on jet powered tri-mode aircraft according to claim 7, wherein jet exhaust is not routed through the first and second thermally-controlled nozzle doors in the airplane mode, the jet exhaust being routed around and not heating the second and fourth metals, to thereby not open the upper and lower nozzle doors.

10. The thermally-controlled nozzle for use on a jet powered tri-mode aircraft according to claim 9, wherein the thermally-controlled nozzle operates as a foil when the jet exhaust is routed around the first and second thermally-controlled nozzles.

11. The thermally-controlled nozzle for use on a jet powered tri-mode aircraft according to claim 7, wherein the slot in the upper nozzle door for accommodating the outer end of the upper bimetal spring comprises an outer cylindrical area, and wherein the slot in the lower nozzle door for accommodating the outer end of the lower bimetal spring comprises an outer cylindrical area.

12. The thermally-controlled nozzle for use on a jet powered tri-mode aircraft according to claim 11, wherein the upper bimetal spring comprises an outer cylindrical portion for fitting inside the outer cylindrical area of the slot in the upper nozzle door, and wherein the lower bimetal spring comprises an outer cylindrical portion for fitting inside the outer cylindrical area of the slot in the lower nozzle door.

13. The thermally-controlled nozzle for use on a jet powered tri-mode aircraft according to claim 7, wherein the slot in the upper cavity member for accommodating the inner end of the upper bimetal spring comprises an inner cylindrical area, and wherein the slot in the lower cavity member for accommodating the inner end of the lower bimetal spring comprises an inner cylindrical area.

14. The thermally-controlled nozzle for use on a jet powered tri-mode aircraft according to claim 13, wherein the upper bimetal spring comprises an inner cylindrical portion for fitting inside the cylindrical area of the slot in the upper cavity member, and wherein the lower bimetal spring comprises an inner cylindrical portion for fitting inside the cylindrical area of the slot in the lower cavity member.

15. The thermally-controlled nozzle for use on a jet powered tri-mode aircraft according to claim 14, wherein a width, measured in a direction transverse to a length of the rotor, of the outer cylindrical portion of the upper bimetal spring is greater than a width of one of the first layer and the second layer of the upper bimetal spring, and wherein a width of the outer cylindrical portion of the lower bimetal spring is greater than a width of one of the third layer and the fourth layer of the lower bimetal spring.

16. The thermally-controlled nozzle for use on a jet powered tri-mode aircraft according to claim 15, wherein the outer cylindrical portion of the upper bimetal spring serves as an axis about which the upper nozzle door pivots, and wherein the outer cylindrical portion of the lower bimetal spring serves as an axis about which the lower nozzle door pivots.

17. The thermally-controlled nozzle for use on a jet powered tri-mode aircraft according to claim 14, wherein a width of the inner cylindrical portion, measured in a direction transverse to a length of the rotor, of the upper bimetal spring is substantially greater than a width of one of the first and second layers, wherein the first coefficient of expansion is substantially the same as the third coefficient of expansion, and wherein the second coefficient of expansion is substantially the same as the fourth coefficient of expansion.

18. The thermally-controlled nozzle for use on jet powered tri-mode aircraft according to claim 17, wherein the first metal of the upper layer of the upper bimetal spring is substantially the same as the third metal of the lower layer of the lower bimetal spring, and wherein the second metal of the lower layer of the upper bimetal spring is substantially the same as the fourth metal of the upper layer of the lower bimetal spring.

19. The thermally-controlled nozzle for use on a jet powered tri-mode aircraft according to claim 14, wherein the inner and outer cylindrical portions of the upper bimetal spring have coefficients of expansion substantially the same as the coefficient of expansion of the first metal, and wherein the inner and outer cylindrical portions of the lower bimetal spring have coefficients of expansion substantially the same as the coefficient of expansion of the third metal.

* * * * *